United States Patent [19]

Heitmann et al.

[11] Patent Number: 4,578,719
[45] Date of Patent: Mar. 25, 1986

[54] TRACKING ERROR RECOGNITION IN REPRODUCED DIGITAL SIGNALS

[75] Inventors: Jürgen Heitmann, Alsbach-Hähnlein; Rolf Loos, Eppertshausen, both of Fed. Rep. of Germany; Peter Wagner, Newark, N.J.

[73] Assignee: Robert Bosch GmbH, Stuttgart, Fed. Rep. of Germany

[21] Appl. No.: 679,035

[22] Filed: Dec. 6, 1984

[51] Int. Cl.$^4$ .................. G11B 27/36; G11B 21/10
[52] U.S. Cl. ........................... 360/31; 360/77
[58] Field of Search .................. 360/31, 77, 53

[56] References Cited

U.S. PATENT DOCUMENTS

| | | | |
|---|---|---|---|
| 4,333,177 | 6/1982 | Sutterlin | 360/31 |
| 4,404,603 | 9/1983 | Warren et al. | 360/31 |
| 4,467,372 | 8/1984 | Juodenas | 360/31 |

FOREIGN PATENT DOCUMENTS 3143700  7/1982  Fed. Rep. of Germany ........ 360/77

Primary Examiner—Vincent P. Canney
Attorney, Agent, or Firm—Frishauf, Holtz, Goodman & Woodward

[57] ABSTRACT

A conventional multiple recognition unit provides a multiple error signal whenever digitally coded television signals supplied in successive data blocks to the error recognition unit finds by reference to checkwords that the error correction capabilities of the unit are exceeded in any data block. In order to determine when such multiple errors are related to faulty tracking, the multiple error signals are prolonged in duration, overlaps between the multiple error signal and a preceding prolonged signal are detected, and the latter are then integrated. The level of the integrated signal determines the likelihood or presence of tracking error.

3 Claims, 4 Drawing Figures

TRACKING ERROR RECOGNITION IN REPRODUCED DIGITAL SIGNALS

This invention concerns the recognition of tracking errors in connection with the reproduction of digital signals recorded on a magnetic tape, and particularly when the digital signals are recorded on tracks running obliquely across the tape.

It is already known in the case of recording and reproducing analog video signals on or from magnetic tape to investigate a picked-up frequency modulated video signal by means of an envelope curve detector for changes in level and to process the error signal resulting from the irregularities of the envelope curve in a manner suitable for avoiding tracking errors, as more fully explained in German published patent application (OS) No. 31 43 700.

It is also known, in the case of a recording and reproducing equipment involving recording adjacently-lying pairs of tracks, to dispose the working gaps of the magnetic heads for recording and reproduction with different azimuth angles, so that the phase shift of the picked-up signals resulting from an erroneous reproduction can be supplied to a control unit for maintaining tracking. For that purpose, however, it is necessary to have a double magnetic head with gaps disposed in mirror image to each other for simultaneous recording or picking up of a double track.

SUMMARY OF THE INVENTION

It is an object of the present invention to provide tracking error recognition which works also with digitally encoded video signals and with which use can be made of existing error correction systems, so that only a small number of components need to be added in order to carry out the method. Briefly, a circuit is used that responds to multiple errors and its output is amplified and integrated over a predetermined stretch of time, the integrated output then being used to produce an error indication.

BRIEF DESCRIPTION OF THE DRAWINGS

The invention is further described by way of illustrative example with reference to the annexed drawings, in which.

DESCRIPTION OF THE ILLUSTRATED EMBODIMENT

Figure 1:
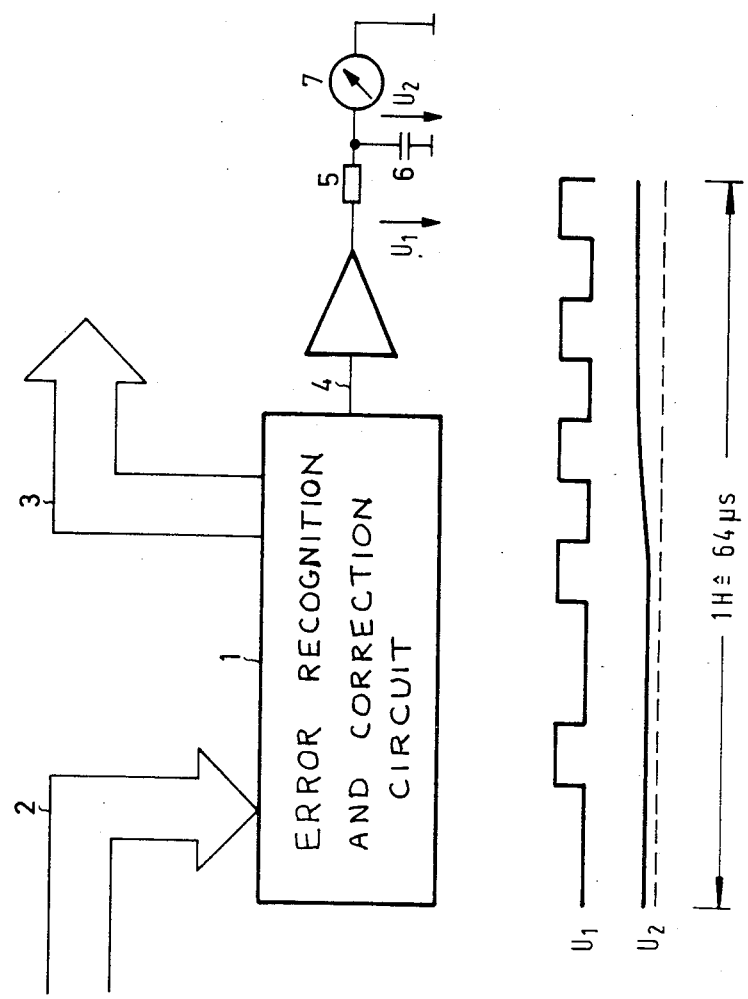
FIG. 1 is a basic diagram of a circuit for carrying out the evaluation of tracking error.

The block 1 in FIG. 1 designates a circuit for error recognition and error correction which receives digitally coded data from the data line 2. The data in question are delivered as reproduced by a magnetic tape recorder-reproducer from a magnetic tape. Errors contained in the reproduced data are corrected according to certain criteria and then passed out to the data line 3 for further processing. For carrying out the necessary error recognition and error correction, check words can be added at the time a digital picture signal is created, to provide redundance so that errors can be recognized. In reproduction from tape, error recognition and error correction can be carried out with the help of these check words. The operation of such systems is well-known and does not need to be described further here.

Figure 2:
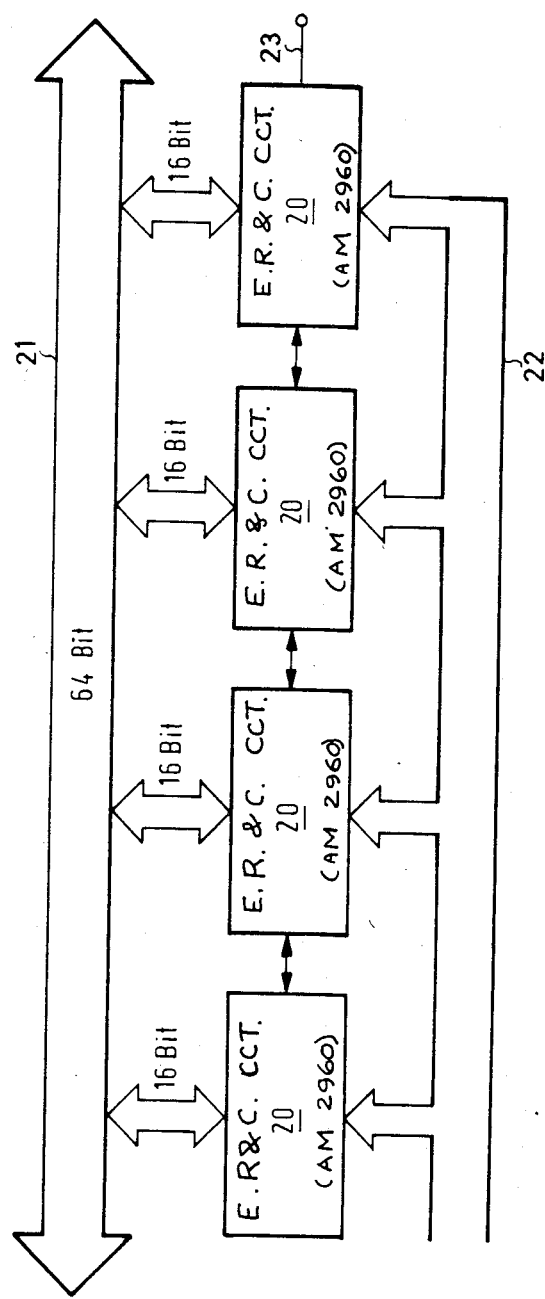
FIG. 2 is a block circuit diagram of an error recognition and correction circuit commonly available.

FIG. 2 shows an embodiment of an error recognition and correction system that can be used in the circuit of FIG. 1, constituted in the form of largescale integrated circuits, for example using the 16-bit error recognition and correction units available from Advanced Micro-Devices, Incorporated under the designation AM 2960 which can be operated in cascade. These units, which can be referred to as comparators, are designated 20 in FIG. 2. Four of them are shown, each receiving a different set of 16 bits from the 64-bit data bus 21 and perform a comparison with the 8-bit wide check words made available on the data line 22. A warning signal is provided at the output 23 of the system of FIG. 2 whenever the correctability of the system is overtaxed. This "multiple error" indication or warning always concerns a single correction block. The data of a video line are subdivided into 12 blocks each having 60 data words. If within one line one or more data blocks are impaired, that will be designated by the "multiple error" indication for the duration of these impaired or disturbed blocks. The keying ratio or duty cycle of the "multiple error" output signal is accordingly a measure for the error rate, the number of errors per unit of time. By means of the integration circuit composed of the series resistance 5 and the capacitor 6, the other terminal of which is connected to fixed potential such as ground potential, the "multiple error" signal at the output 4 of the error recognition and correction circuit 1 of FIG. 1 is integrated over a particular period of time related to the time constant of the circuit, after which it is supplied to the instrument 7 for indication. By suitable choice of the components 5 and 6, the time constant can be put at any desired value. The indication characteristic of the instrument 7 may conveniently be linear, or it may , instead be logarithmic.

Figure 3:
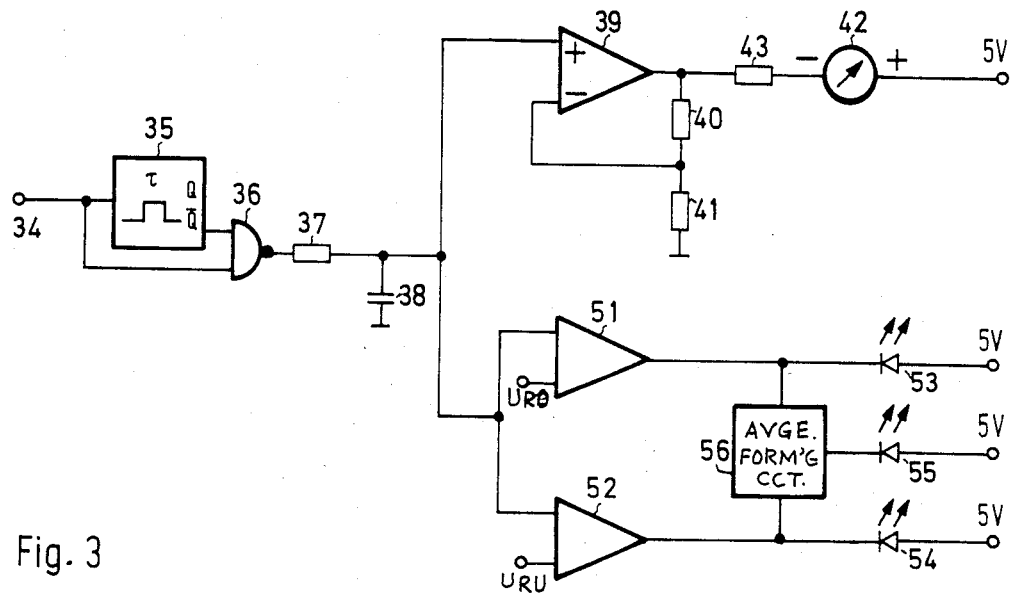
FIG. 3 is a block circuit diagram of an embodiment of a tracking error indicator in accordance with the invention.

FIG. 3 shows another embodiment of the evaluation circuit for the multiple error signal supplied at the output 4 of the error recognition and correction circuit 1 of FIG. 1. Since the error signal appears with, relatively little bunching in normal reproduction operation of a magnetic tape machine, for example about 100 to 1000 times per second with a duration each time of about 70 nanoseconds, it is in consequence difficult to provide integration of this signal over a longer period of time. For this reason, the error signal from the input 34, which corresponds to the output 4 in FIG. 1 and the output 23 in FIG. 2, is prolonged or "stretched" by means of the "boxcar" circuit 35 that may be referred to as a multiplying or pulse-stretching circuit.

The signal to be integrated is formed by correlation of the input and output of the duration multiplying circuit 35. In the illustrated case, the correlation function is performed by a NAND-gate 36. The pulse sequence at the output of the NAND-gate 36 is integrated by means of the RC network 37,38 in the manner already described, and then supplied to the non-inverting input of an operational amplifier 39. The output of the operational amplifier 39 is fed back through the resistance 40 to the inverting input of the operational amplifier. That inverting input is connected through the resistance 41 with a fixed potential, ground potential in the illustrated case.

The operational amplifier 39 accordingly serves simply as an amplifier, and the magnitudes of the resistances 40 and 41 are so determined that a maximum indicator stroke of the indicating instrument 42 is obtained, the indicator instrument being connected through the resistance 43 with the output of the operational amplifier 39. A second terminal of the indicating instrument 42 is connected with a constant voltage source, for example a 5 volt voltage source.

Since the error density or bunching is least when the tracking of the magnet heads in pick-up operation is best, the circuit is connected so that a maximum indication (full stroke) results when errors are at a minimum. If a magnetic head starts to veer away from the track or if the tracking movement of the magnetic head in reproduction deviates somewhat from the track orientation provided in recording, the number of errors increases and the indication stroke falls back. By observing the instrument 42, an optimum tracking adjustment can be obtained with reference to multiple errors contained in the reproduced digital video signal.

For clear distinction of the momentarily present error rate, i.e., the number of errors per unit of time, the output of the integration circuit in FIG. 3 is supplied in parallel to two operational amplifiers 51 and 52. Both operational amplifiers operate as comparators, a threshold voltage URO being supplied as upper threshold value to the second input of the operational amplifier 51 and a threshold voltage URU being supplied as lower threshold value to the second input of the operational amplifier 52. The outputs of the two amplifiers 51 and 52 are supplied, on the one hand, directly to respective optical indicating circuits 53 and 54 and, on the other hand, to the respective inputs of a digital logic circuit 56 which generates by addition and division an average of the voltage values at the two logic circuit inputs. The average voltage thus obtained is the input of another optical indicating device 55. These optical indicators may, for example, be light-emitting diodes LEDs, as illustrated in FIG. 3.

Figure 4:
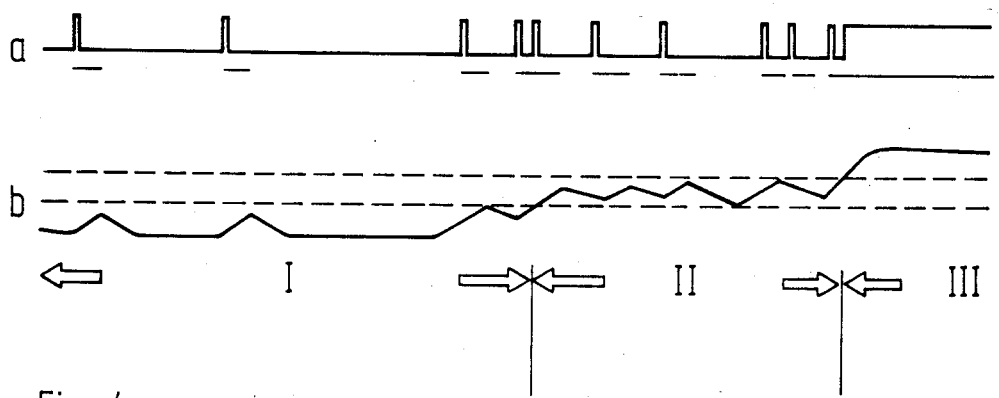
FIG. 4 is a pulse diagram for making clear the manner of operation of the circuit of FIG. 3.

FIG. 4 plots the occurrence of multiple errors against the passage of time for an illustrated period of operation. It is assumed for this illustration that there is a low error rate during a time lapse corresponding to the region I of FIG. 4, a medium error rate for the region II and a high error rate for a region III. As can be seen from the graphic representation of the integration voltage appearing at the output of the RC network 37,38, which is drawn in line b of FIG. 4, the integrator voltage does not reach the lower threshold value in region I. In consequence, the output of the operational amplifier 52 is low and as the result of the provision of a supply voltage of about 5 volts to the optical device 54, the latter lights up. According to the definitions embodied in the system, it is ascertained that there is a low error rate, which means at the same time that correct tracking is indicated. If the error rate increases and reaches a medium value, as in region 11, the integrator voltage rises to a value between the two threshold voltages URO and URU. The logic circuit 56 in this case produces an output signal. According to the definitions embodied in the system, the output of the logic circuit drops to the lower of its two possible output values, so that the optical indicating device 55, having a constant voltage supply, lights up. This indicates a medium error rate and an operator or a supervisor is warned optically of the possibility that the tracking is poor. If the error rate rises still further, the integrator voltage rises higher and exceeds the upper threshold voltage, as shown in region III. The output of the operational amplifier 51 falls to its low value and the optical device 55 indicates existence of an undesired condition of operation.

The circuit 35 may be constituted in any of a number of ways. It may be an amplifier that quickly charges a capacitance that discharges through a resistance great enough to keep the output voltage above the response threshold of a following stage for a considerable time. Thus such an amplifier circuit followed by a Schmitt trigger circuit with a hysteresis characteristic could provide the desired operation of the circuit 35. A monostable multivibrator could also be used, in which case the duration of the output pulse would not depend on the amplitude or duration of the input pulse.

Although the invention has been described with reference to a particular illustrative example, it will be understood that modifications and variations are possible within the inventive concept.

We claim:

1. Method of recognizing tracking error in reproduction of digitally coded television signals recorded on a magnetic tape, comprising:
   detecting the presence of multiple errors in any data block of said reproduced television signals supplied block by block to a check-word-operated error detection unit which provides an output signal in response to each detection of multiple errors in a data block;
   prolonging the duration of each of said output signals;
   detecting the overlap of a said output signal before prolongation with the prolongation of a previous output signal of said error detection unit to provide and overlap signal;
   integrating successions of overlap signals over a constant integration time dimension to provide an integrated output signal, and
   comparing said integrated output signal with at least one predetermined voltage level for producing a tracking error signal.

2. Apparatus for indicating the presence of significant tracking errors in reproduction of digitally coded television signals recorded on a magnetic tape, comprising:
   means for detecting the presence of multiple errors in any data block of said reproduced television signals supplied block by block to a check- word-operated error detection unit, said error detection unit being constituted to provide an output signal corresponding to the occurrence of multiple errors in any said data block of television signals;
   signal prolonging means responsive to said multiple error signal output of said error detection unit and having an output for prolonged multiple error signals;
   logic circuit means for indicating the coincidence of a multiple error output signal of said error detection unit and a prolonged output signal corresponding to a previous multiple error signal, and thereby producing an error correlation signals, each of which results from a said coincidence;
   means for integrating said error correlation signals over a constant integration time dimension and thereby providing integrated output signals;
   means for comparing said integrated output signals with at least one predetermined voltage level for providing monitoring signals, and means responsive to said monitoring signals for indicating a measure of tracking error magnitude to an observer.

3. Apparatus according to claim 2, in which said comparing means include two voltage comparators supplied in parallel with said integrated output signals of said integrating means, said respective comparators being furnished with different threshold voltages, and in which said indicating means comprises three indicating devices for respectively indicating whether the magnitude of said integrated output signal lies below both thresholds, between said thresholds or above both thresholds.

* * * * *